US012632653B2

(12) United States Patent
Chen et al.

(10) Patent No.: US 12,632,653 B2
(45) Date of Patent: May 19, 2026

(54) MODULARIZED ATTENTIVE GRAPH NETWORKS FOR FINE-GRAINED REFERRING EXPRESSION COMPREHENSION

(71) Applicant: INTERNATIONAL BUSINESS MACHINES CORPORATION, Armonk, NY (US)

(72) Inventors: Zhenfang Chen, Cambridge, MA (US); Chuang Gan, Cambridge, MA (US); Bo Wu, Cambridge, MA (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 17/936,097

(22) Filed: Sep. 28, 2022

(65) Prior Publication Data

US 2024/0111950 A1 Apr. 4, 2024

(51) Int. Cl.
| | |
|---|---|
| *G06F 40/20* | (2020.01) |
| *G06F 40/205* | (2020.01) |
| *G06N 3/045* | (2023.01) |
| *G06T 7/12* | (2017.01) |

(52) U.S. Cl.
CPC ........... *G06F 40/205* (2020.01); *G06N 3/045* (2023.01); *G06T 7/12* (2017.01)

(58) Field of Classification Search
CPC ....... G06F 40/205; G06F 40/30; G06N 3/045; G06N 3/044; G06N 3/08; G06N 5/022; G06T 7/12; G06V 30/1985; G06V 10/426; G06V 10/82; G06V 30/19173
See application file for complete search history.

(56) References Cited

U.S. PATENT DOCUMENTS

| | | | |
|---|---|---|---|
| 9,965,705 B2 | 5/2018 | Chen et al. | |
| 10,754,851 B2 | 8/2020 | Cohen et al. | |
| 2021/0406468 A1 | 12/2021 | Qin et al. | |
| 2022/0383859 A1* | 12/2022 | Mimassi | ................. G10L 15/16 |

OTHER PUBLICATIONS

Hu et al., "Modeling Relationships in Referential Expressions with Compositional Modular Networks", Proceedings of the IEEE Conference on Computer Vision and Pattern Recognition (CVPR), 2017, pp. 1115-1124 (Year: 2017).*

(Continued)

*Primary Examiner* — Qian Yang
(74) *Attorney, Agent, or Firm* — Cantor Colburn LLP; Robert D. Bean

(57) ABSTRACT

A computer-implemented method for fine-grained referring expression comprehension is provided. The computer-implemented method includes receiving, at a processor, a textual expression and an image as inputs and executing, at the processor, fine-grained referring expression comprehension. The executing includes decomposing the textual expression into different textual modules, extracting visual regional proposals from the image, using language-guided graph neural networks to mine fine-grained object relations from the visual regional proposals and aggregating different matching similarities between the different textual modules and the fine-grained object relations.

12 Claims, 7 Drawing Sheets

(56) References Cited

OTHER PUBLICATIONS

Li, "Attentive Gated Graph Neural Network for Image Scene Graph Generation",Apr. 2, 2020, Symmetry 2020, 12, 511, 13p.

Li, "Cross-Modality Synergy Network for Referring Expression Comprehension and Segmentation", Neurocomputing, 2021; 34p.

Li, "Visualbert: a Simple and Performant Baseline for Vision and Language", Computer Vision and Pattern Recognition, 2019. 14p.

Qian, "Scene Graph Refinement Network for Visual Question Answering", IEEE Transactions on Multimedia, 2021, 12p.

Yu, "Context Prior for Scene Segmentation", CVPR 2020; 109.

Yu, "POI: Multiple Object Tracking withHigh Performance Detection andAppearance Feature", ECCV 2016 Workshops pp. 36-42, 16p.

Zheng, "Modular Graph Attention Network for Complex Visual Relational Reasoning", ACCV 2020, 17p.

Agrawal et al., "VQA: Visual Question Answering", arXiv:1505. 00468v7 [cs.CL], Oct. 27, 2016, 25 pages.

Li et al., "Actional-structural graph convolutional networks for skeleton-based action recognition", 2019 IEEE/CVF Conference on Computer Vision and Pattern Recognition (CVPR), Jun. 2019, pp. 3595-3603.

Pal et al., "Image Retrieval: A Literature Review", International Journal of Advanced Research in Computer Engineering and Technology (IJARCET), Jun. 2012, 5 pages.

Yu et al., "Generative Image Inpainting with Contextual Attention", arXiv:1801.07892v2 [cs.CV], Mar. 21, 2018, 15 pages.

Yu et al., "Modeling Context in Referring Expressions", arXiv:1608. 00272v3 [cs.CV], Aug. 10, 2016, 19 pages.

* cited by examiner

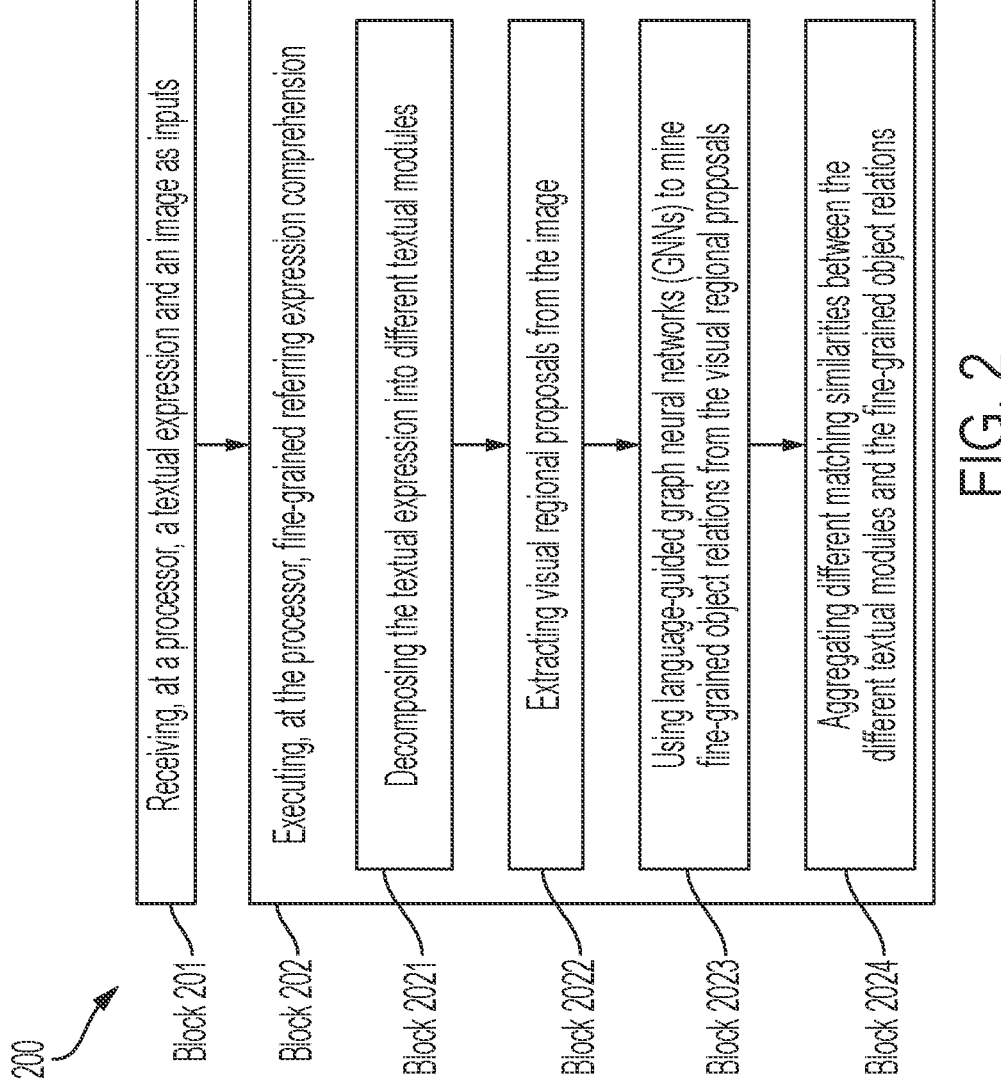

Block 201 — Receiving, at a processor, a textual expression and an image as inputs Block 202 — Executing, at the processor, fine-grained referring expression comprehension Block 2021 — Decomposing the textual expression into different textual modules Block 2022 — Extracting visual regional proposals from the image Block 2023 — Using language-guided graph neural networks (GNNs) to mine fine-grained object relations from the visual regional proposals Block 2024 — Aggregating different matching similarities between the different textual modules and the fine-grained object relations

MODULARIZED ATTENTIVE GRAPH NETWORKS FOR FINE-GRAINED REFERRING EXPRESSION COMPREHENSION

BACKGROUND

The present invention generally relates to artificial intelligence and, more specifically, to development of artificial intelligence from modularized attentive graph networks for fine-grained referring expression comprehension.

Artificial intelligence (AI) is intelligence demonstrated by machines, as opposed to the natural intelligence displayed by animals including humans. AI can manifest in various forms including, but not limited to, learning or machine learning (ML), natural language processing (NLP) and perception or machine perception. ML relates to the study of computer algorithms that improve automatically through experience. NLP allows machines to read and understand human language. A sufficiently powerful natural language processing system would enable natural-language user interfaces and the acquisition of knowledge directly from human-written sources, such as newswire texts. Some straightforward applications of NLP include information retrieval, question answering and machine translation. Machine perception is the ability to use input from sensors (such as cameras, microphones, wireless signals, active lidar, sonar, radar and tactile sensors) to deduce aspects of the world. Applications of machine perception include, but are not limited to, speech recognition, facial recognition and object recognition.

SUMMARY

Embodiments of the present invention are directed to a computer-implemented method for fine-grained referring expression comprehension. A non-limiting example of the computer-implemented method includes receiving, at a processor, a textual expression and an image as inputs and executing, at the processor, fine-grained referring expression comprehension. The executing includes decomposing the textual expression into different textual modules, extracting visual regional proposals from the image, using language-guided graph neural networks (GNNs) to mine fine-grained object relations from the visual regional proposals and aggregating different matching similarities between the different textual modules and the fine-grained object relations.

Embodiments of the present invention are directed to a computer program product for fine-grained referring expression comprehension. A non-limiting example of the computer program product includes one or more computer readable storage media having computer readable program code collectively stored on the one or more computer readable storage media. The computer readable program code is executed by a processor of a computer system to cause the computer system to perform a method. The method includes receiving, at the processor, a textual expression and an image as inputs and executing, at the processor, fine-grained referring expression comprehension. The executing includes decomposing the textual expression into different textual modules, extracting visual regional proposals from the image, using language-guided graph neural networks (GNNs) to mine fine-grained object relations from the visual regional proposals and aggregating different matching similarities between the different textual modules and the fine-grained object relations.

Embodiments of the invention are directed to a computing system. A non-limiting example of the computing system includes a processor, a memory coupled to the processor and one or more computer readable storage media coupled to the processor, the one or more computer readable storage media collectively containing instructions that are executed by the processor via the memory to implement a method. The method includes receiving, at the processor, a textual expression and an image as inputs and executing, at the processor, fine-grained referring expression comprehension. The executing includes decomposing the textual expression into different textual modules, extracting visual regional proposals from the image, using language-guided graph neural networks (GNNs) to mine fine-grained object relations from the visual regional proposals and aggregating different matching similarities between the different textual modules and the fine-grained object relations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 is a flow diagram illustrating a computer-implemented method for fine-grained referring expression comprehension in accordance with one or more embodiments of the present invention;

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, referring expression comprehension aims to localize a target object in an image described by a referring expression phrased in natural language. Referring expression comprehension models are designed for simple situations with short text expressions and limited visual complexity. They do not combine modularized networks with attentive graph networks, thus limiting their ability to mine fine-grained relationships. Due to these drawbacks, a computing system running referring expression comprehension models typically cannot localize a target object referred by a compositional expression from an image set with similar visual elements.

Turning now to an overview of the aspects of the invention, one or more embodiments of the invention address the above-described shortcomings of the prior art by localizing a target object referred by a compositional expression from an image set with similar visual elements. This is accomplished by fine-grained referring expression comprehension; decomposition of a fine-grained referring expression into different modules so that sub-modularized networks can handle a part of the fine-grained expression; and an understanding of long and compositional text expressions and a distinguishing of subtle visual differences.

Figure 1:
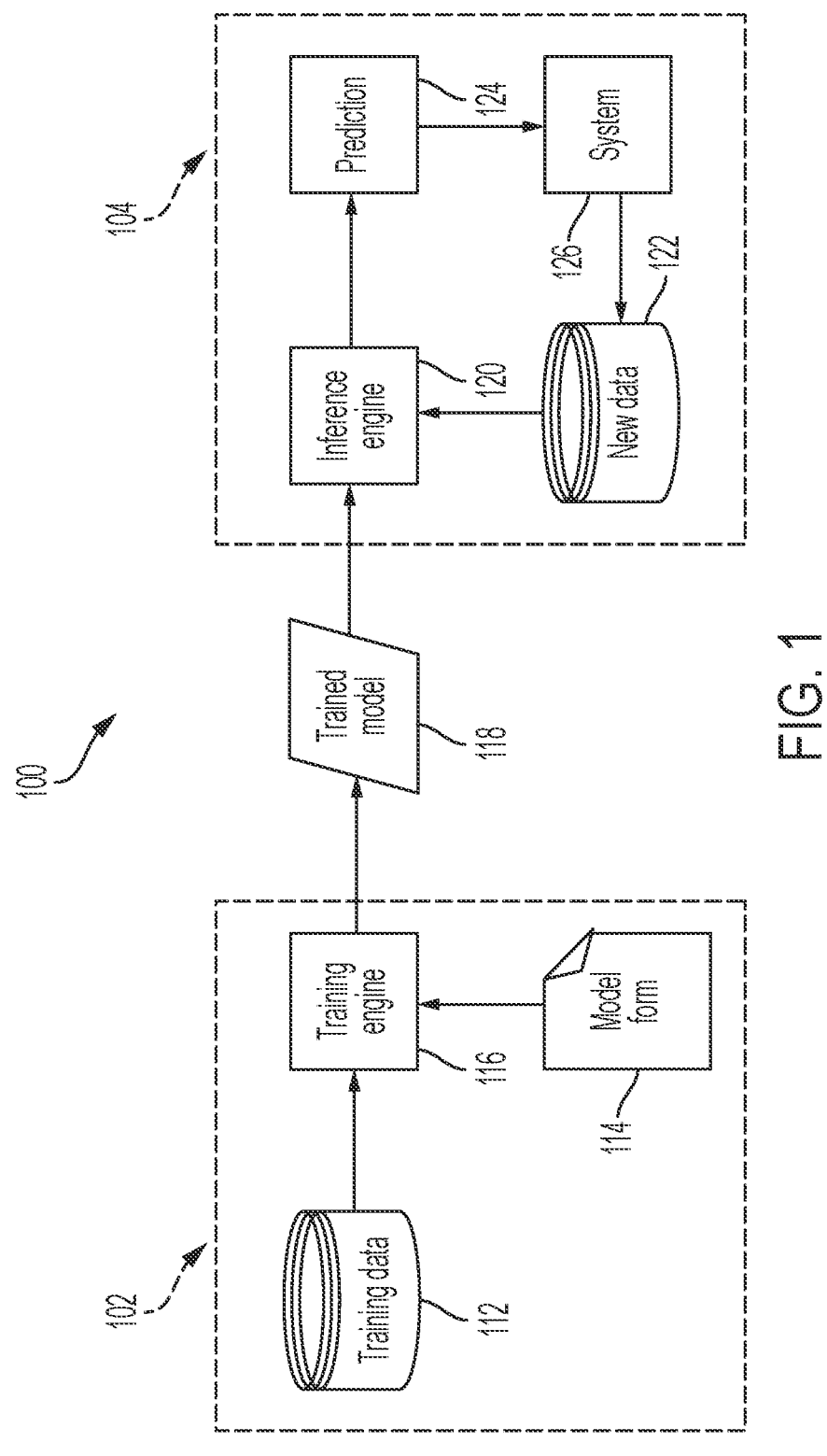
FIG. 1 depicts a block diagram of components of a machine learning training and inference system according to one or more embodiments of the present invention.

Turning now to a more detailed description of aspects of the present invention, FIG. 1 depicts a block diagram of components of a machine learning training and inference system 100. The machine learning training and inference system 100, in accordance with one or more embodiments of the invention, can utilize machine learning techniques to perform tasks, such as localizing a target object referred by a compositional expression from an image set with similar visual elements. More specifically, one or more embodiments of the invention described herein can incorporate and utilize rule-based decision making and artificial intelligence (AI) reasoning to accomplish the various operations described herein, namely handling fine-grained referring expression comprehension, decomposing a fine-grained referring expression into different modules so that sub-modularized networks can handle a part of the fine-grained expression and understanding long and compositional text expressions and distinguishing subtle visual differences.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for localizing a target object referred by a compositional expression from an image set with similar visual elements, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 100 performs training 102 and inference 104. During training 102, a training engine 116 trains a model (e.g., the trained model 118) to perform a task. Inference 104 is the process of implementing the trained model 118 to perform the task in the context of a larger system (e.g., a system 126).

The training 102 begins with training data 112, which can be structured or unstructured data. The training engine 116 receives the training data 112 and a model form 114. The model form 114 represents a base model that is untrained. The model form 114 can have preset weights and biases, which can be adjusted during training. It should be appreciated that the model form 114 can be selected from many different model forms depending on the task to be performed. For example, where the training 102 is to train a model to perform image classification, the model form 114 can be a model form of a CNN (convolutional neural network). The training 102 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 112 includes labeled images, including images of the object of interest with associated labels (ground truth) and other images that do not include the object of interest with associated labels. In this example, the training engine 116 takes as input a training image from the training data 112, makes a prediction for classifying the image, and compares the prediction to the known label. The training engine 116 then adjusts weights and/or biases of the model based on results of the comparison, such as by using backpropagation. The training 102 can be performed multiple times (referred to as "epochs") until a suitable model is trained (e.g., the trained model 118).

Once trained, the trained model 118 can be used to perform inference 104 to perform a task. The inference engine 120 applies the trained model 118 to new data 122 (e.g., real-world, non-training data). For example, if the trained model 118 is trained to classify images of a particular object, such as a chair, the new data 122 can be an image of a chair that was not part of the training data 112. In this way, the new data 122 represents data to which the model 118 has not been exposed. The inference engine 120 makes a prediction 124 (e.g., a classification of an object in an image of the new data 122) and passes the prediction 124 to the system 126. The system 126 can, based on the prediction 124, taken an action, perform an operation, perform an analysis, and/or the like, including combinations and/or multiples thereof. In some embodiments of the invention, the system 126 can add to and/or modify the new data 122 based on the prediction 124.

In accordance with one or more embodiments of the invention, the predictions 124 generated by the inference engine 120 are periodically monitored and verified to ensure that the inference engine 120 is operating as expected. Based on the verification, additional training 102 can occur using the trained model 118 as the starting point. The additional training 102 can include all or a subset of the original training data 112 and/or new training data 112. In accordance with one or more embodiments of the invention, the training 102 includes updating the trained model 118 to account for changes in expected input data.

With reference to FIG. 2, a computer-implemented method 200 for fine-grained referring expression comprehension is provided and is executable on the machine learning training and inference system 100 of FIG. 1 for example. The computer-implemented method 200 includes receiving, at a processor, a textual expression and an image as inputs at block 201 and executing, at the processor, fine-grained referring expression comprehension at block 202. The executing of block 202 can include decomposing the textual expression into different textual modules at block 2021, extracting visual regional proposals from the image at block 2022, using language-guided graph neural networks (GNNs) to mine fine-grained object relations from the visual regional proposals at block 2023 and aggregating different matching similarities between the different textual modules and the fine-grained object relations at block 2024.

As used herein, "matching similarities" refers to a matching similarity between a visual region and a text expression and can be scored on a scale normalized into 0~1. The higher the matching similarity is for a given text expression, the better the matching between the visual region and the text expression. For example, the text expression "a laptop" has a better matching similarity with the visual region $x_4$ than the visual region $x_1$ in the image 602 of FIG. 3 to be described below.

In accordance with one or more embodiments of the present invention, the decomposing of the textual expression of block 2021 can include modularized language parsing and, in some cases, modularized language parsing of the textual expression into main, spatial and relation modules. The extracting of the visual regional proposals from the image of block 2022 can include region proposal networking to detect objects in the image, regarding each object in the image as a node and regarding each relationship between two objects in the image as an edge between nodes. The using of the language-guided GNNs to mine the fine-grained object relations from the visual regional proposals of block 2023 can include building a graph for each textual module. Each graph can learn representations for each textual module and predict matching similarity scores between each visual regional proposal and the textual modules. The aggregating of the different matching similarities of block 2024 can be executed iteratively to obtain a final feature embedding for each object in the image.

With reference to FIGS. 3-6, the method 200 of FIG. 2 will now be described in greater detail.

Figure 3:
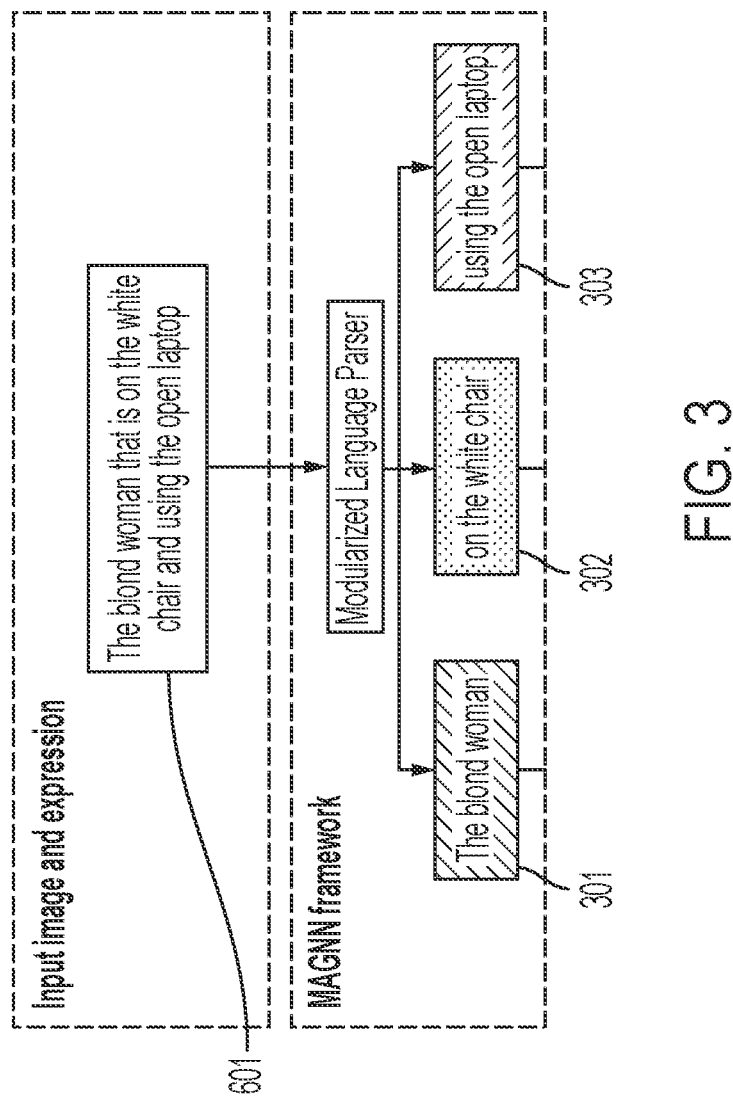
FIG. 3 is a graphical depiction of an initial stage of the method of FIG. 2 in accordance with one or more embodiments of the invention.

As shown in FIGS. 3-6, given a long compositional expression 601 and an image 602 (see FIG. 6), a modularized language parser network is used to parse the language of the long compositional expression into different modules, such as a main module 301, a spatial module 302 and a relation module 303 (see FIG. 3). A region proposal network 401 is then used to detect the objects in the image to obtain a set of object proposal candidates for each of the objects in the image:

$$\{x_j\}_{j=1}^J$$

Figure 4:
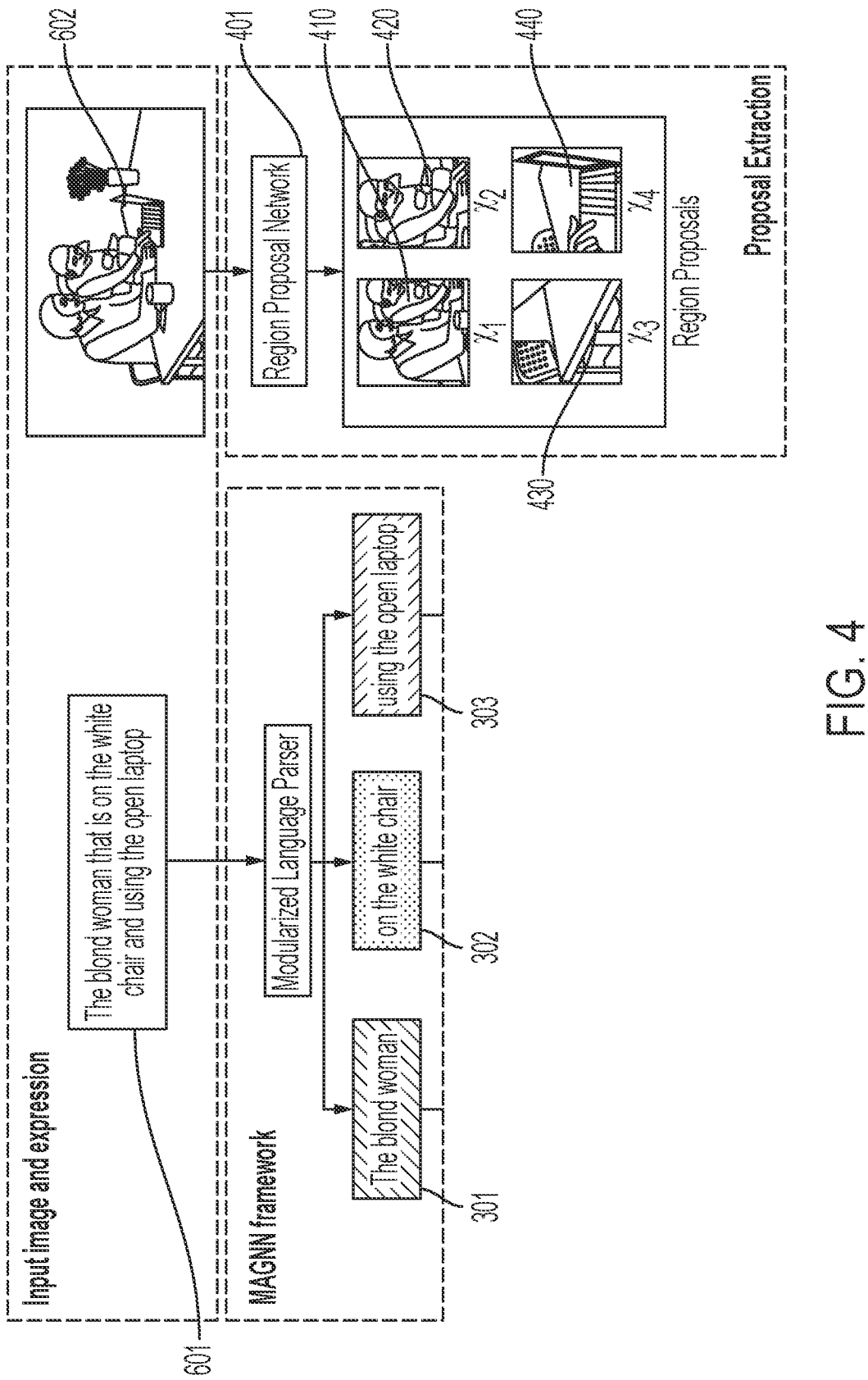
FIG. 4 is a graphical depiction of an intermediate stage of the method of FIG. 2 in accordance with one or more embodiments of the invention.

(see FIG. 4). In this case, there are four objects of note in the image 602. They are: the blond woman, $x_1$, the black-haired man, $x_2$, the white chair, $x_3$, and the open laptop, $x_4$.

Each object in the image 602 is regarded as a node and relationships between two objects are regarded as an edge between two nodes. Thus, as an example, one might regard the blond woman, $x_1$ as sitting on the white chair, $x_3$ and draw an edge between $x_1$ and $x_3$. Similarly, as another example, one might regard the blond woman, $x_1$ as using the open laptop, $x_4$ and draw an edge between $x_1$ and $x_4$.

A graph 501, 502, 503 (see FIG. 5) for each text module is independently built and modularized text representation is then encoded and regarded for guidance for GNNs based on the nodes and the edges of each of the textural modules and the four objects in the image 602. Each graph 501, 502, 503 can effectively learn representations for each module and then be used to predict matching similarity scores between each object proposal candidate and the modules:

$$s_i^{mdl}, \text{where } mdl \in \{\text{main, spatial and relation}\} \text{ and } i \in \{1, 2, 3 ... \}.$$

With the GNN regarding each visual regional proposals (see, e.g., the visual regional proposals 410, 420, 430 of FIG. 4 to be described below) as a node and the relations between two visual regions as edges, the GNNs learn and update the representations for nodes and edges from several iterations and gather valuable information from neighborhood nodes and connected edges. The text expression is used to guide such representation update processes in each iteration. The representation of the modularized text and the updated graph representation are used to calculate the matching similarity between a text expression and a visual region. The parameters of each modularized graph neural network are learned from supervised learning (i.e., the samples from the training process identified as additional training 102 of FIG. 1).

Matching similarities of different modules are then used to obtain final similarities:

$$s_i = a_{mdl} \sum s_i^{mdl}.$$

Where $a_{mdl}$ is a scalar learned by a small neural network to help determine an importance of each module.

Figure 5:
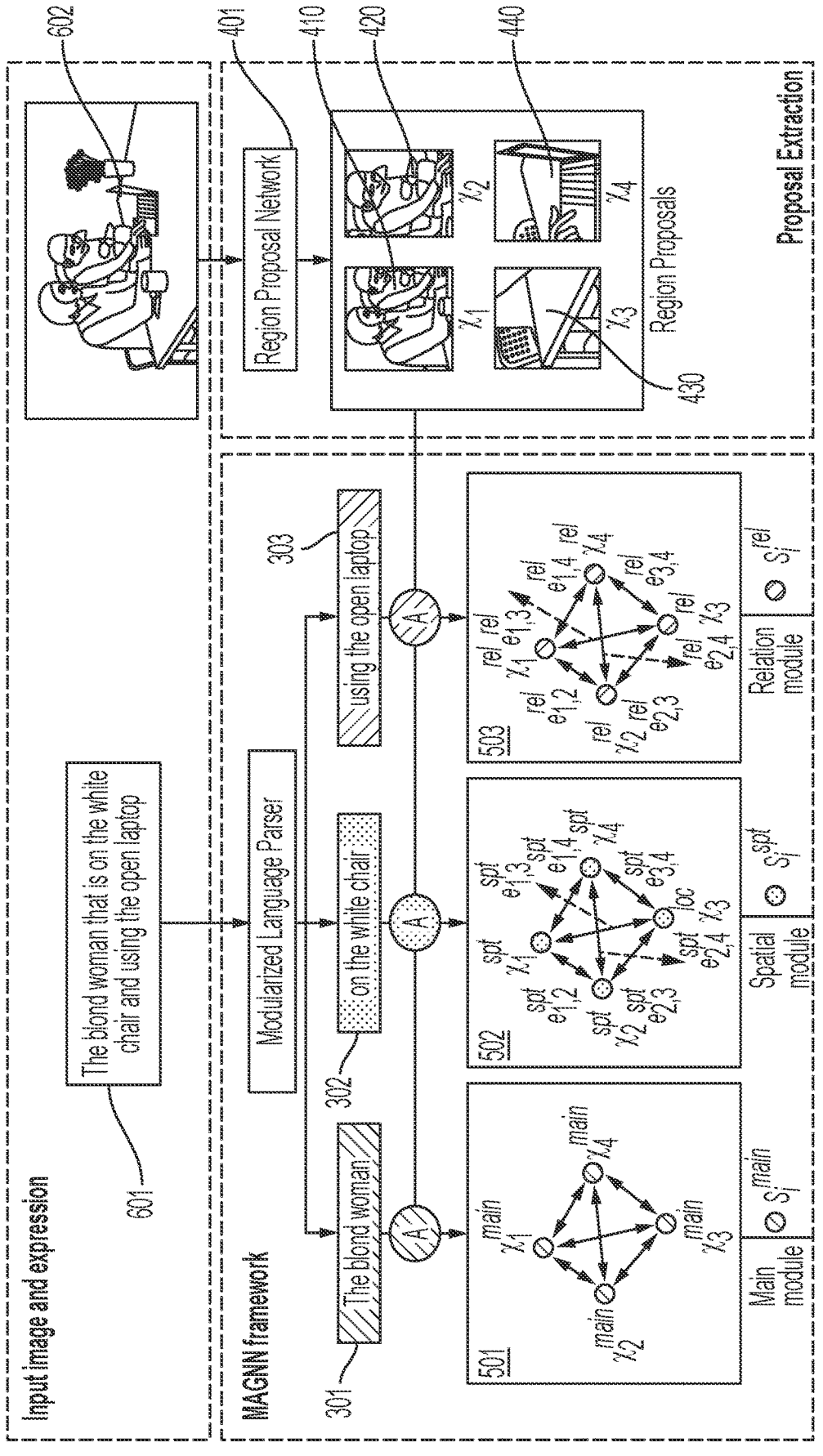
FIG. 5 is a graphical depiction of another intermediate stage of the method of FIG. 2 in accordance with one or more embodiments of the invention.

After matching the modularized text expression with the visual regional graph feature, it is possible to obtain a matching similarity score between the text and visual regions in different modules (e.g., main module 301, spatial module 302 and relation module 303 of FIG. 5) with the goal being to obtain a matching similarity between each visual region and the long text expression. Thus, it is necessary to fuse the matching similarities to obtain a final overall similarity between the visual region and the text expression. This can take a form of a weighted sum of the matching similarities from different modules as shown above where $a_{mdl}$ is a weight to aggregate and is calculated by a small neural network with the modularized text expression (e.g., the main module 301, the spatial module 302 and the relation module 303) as an input. A value of $a_{mdl}$ can be regarded as an importance of each module.

Particularly, as shown in FIG. 3, a first step is to decompose the long compositional expression 601 (see FIG. 6) into the main module 301, the spatial module 302 and the relation module 303 (e.g., "the blond woman" for the main module 301, "on the white chair" for the spatial module 302 and "using the open laptop" for the relation module 303). To achieve this decomposition goal, one or more language parser tools can be used to parse the language of the long compositional expression 601 and average word embeddings of each subphrase to obtain a text representation $R^{mdl}$ for each of the main module 301, the spatial module 302 and the relation module 303.

Alternatively or additionally, each word ($w_i$) in the long compositional expression 601 can be represented with word embeddings and/or a sequence model can be adopted to encode the long compositional expression 603 and to aggregate feature vectors for each of the main module 301, the spatial module 302 and the relation module 303 by $h_i = \text{LSTM}(w_i, h_{i-1})$ and to aggregate the representation $$\{h_i\}_{i=1}^N$$

for each module with $$R^{mdl} = \sum_i w_i^{mdl} h_i.$$

The $R^{mdl}$ will be used to guide the modularized graph networks

Particularly, as shown in FIG. 4, visual regional proposals 410, 420, 430 and 440 are extracted for the image 602 (see FIG. 6) and used to obtain the set of object proposal candidates $$\{x_j\}_{j=1}^J$$

for each image.

Particularly, as shown in FIG. 5, the graphs 501, 502 and 503 are built to represent each object in the image 602 and modularized text embeddings are used to guide information flows of nodes:

$$\{x_j^{mdl}\} \text{ where } j = 1, 2, \ldots \text{ and } mdl \in \{\text{main, spaital and relation}\}$$

and edges $$\{e_{j,k}^{mdl}\}, whew \ j, k = 1, 2, \ldots$$

Each object in the image 602 is regarded as a node in the graphs 501, 502 and 503 and relationships between two objects are regarded as edges between two nodes. The modularized text embeddings $R^{mdl}$ can be used to guide message passing:

$$x_j^{main1} = \tanh(W_1^{main} R^{main} + W_2^{main} x_j^{main} + b^{main}),$$

$$c_j^{main} = \frac{\exp(x_j^{main1})}{\sum_j \exp(x_j^{main1})}, \ x_j^{main2} = \sum c_j^{main} x_j^{main}.$$

Thus, for the spatial module 302, as an example:

$$e_{j,k}^{spt1} = \tanh(W_1^{spt} R^{spt} + W_2^{spt} e_{j,k}^{spt} + b^{spt}),$$

$$c_{j,k}^{spt} = \frac{\exp(e_{j,k}^{spt1})}{\sum_k \exp(e_{j,k}^{spt1})}, \ x_j^{spt2} = \sum c_{j,k}^{spt} x_j^{spt}.$$

$$W_1^{main}, W_2^{main}, b^{main}, W_1^{spt} \text{ and } W_2^{spt}$$

are learnable weights.

Similar operations are performed for the main module 301 and the relation module 303 to obtain an embedding for each node $$(x_j^{rel2}).$$

Such graph information passing mechanisms can be iteratively executed to obtain a final feature embedding for each object in the image 602:

$$\{x_j^{mdl2}\}, \text{ where } j = 1, 2, 3 \ldots \text{ and } mdl2 \in \{\text{main2, } spt2 \text{ and } rel2\}.$$

Figure 6:
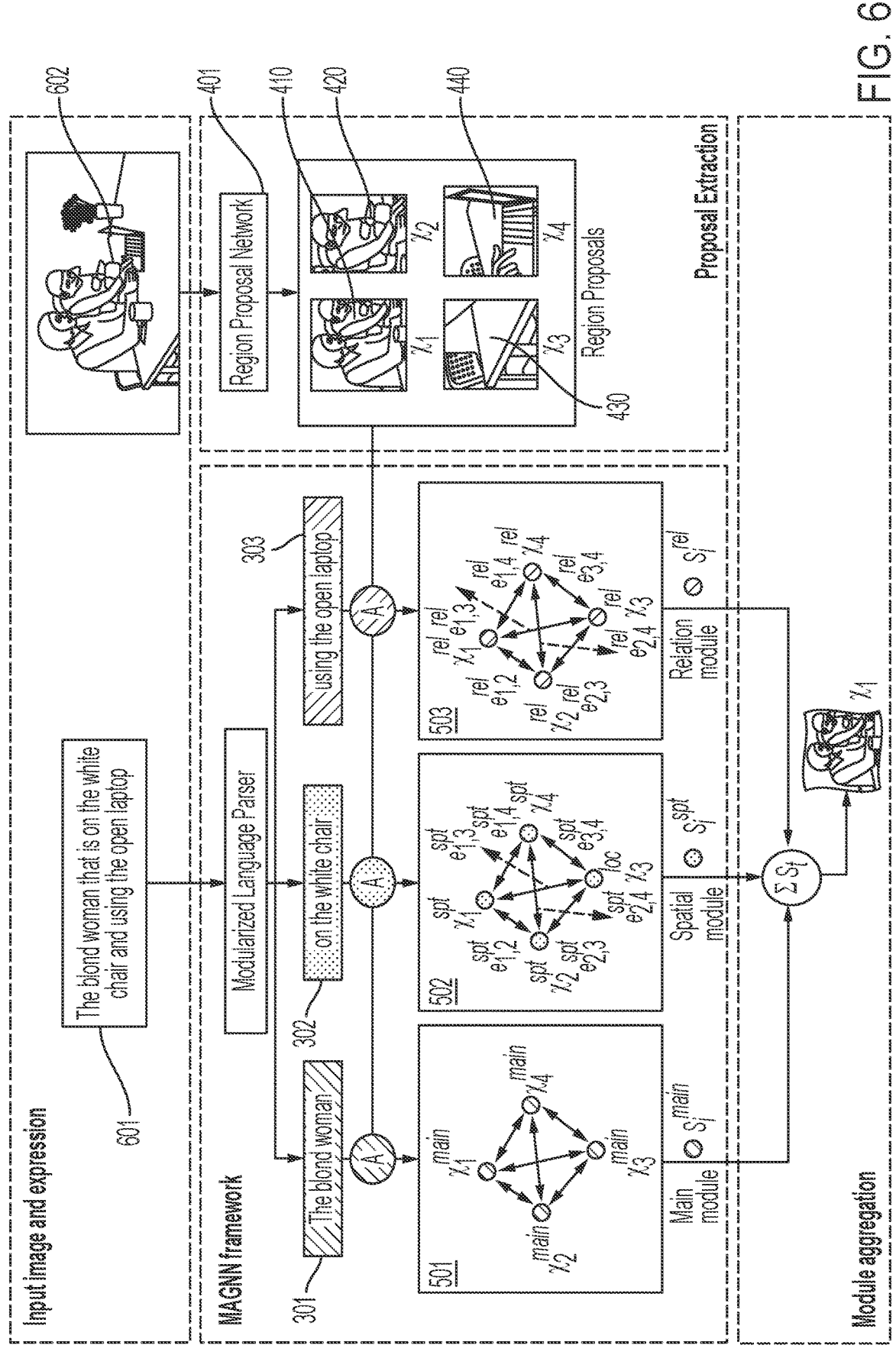
FIG. 6 is a graphical depiction of a late stage of the method of FIG. 2 in accordance with one or more embodiments of the invention.

Particularly, as shown in FIG. 6, final matching similarities between the j-th object and the modularized text embedding are obtained by:

$$s_j^{mdl} = (W_3^{mdl} R^{mdl})(W_4^{mdl} x_j^{mdl2}),$$

-continued $$s_i = a_{mdl} \sum s_i^{mdl},$$

where $$W_3^{mdl}, W_4^{mdl}$$

and $a_{mdl}$ are learnable weights. $mdl \in \{main, spt and rel\}$. $\odot$ denotes dot product.

Figure 7:
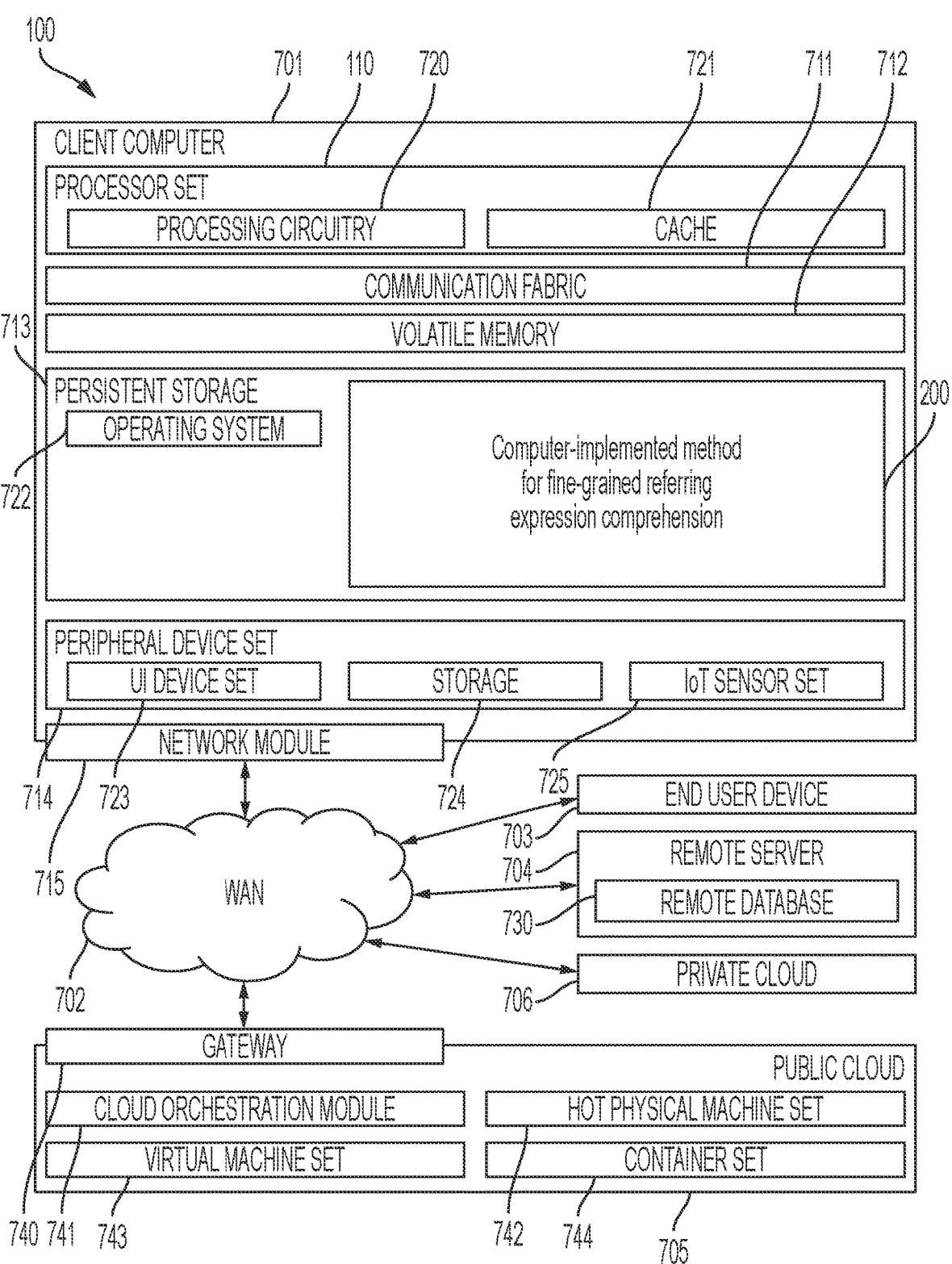
FIG. 7 is a block diagram of a computing environment operable to implement aspects of the invention.

With reference to FIG. 7, a computer or computing device 700 that is included in the machine learning training and inference system 100 of FIG. 1 and that implements the computer-implemented method of FIG. 2 and FIGS. 3-6 in accordance with one or more embodiments of the present invention is provided.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The machine learning training and inference system 100 of FIG. 1 and FIG. 7 contains an example of an environment for the execution of at least some of the computer code involved in performing the inventive methods, such the computer-implemented method for fine-grained referring expression comprehension 200 of FIG. 2. In addition to the computer-implemented method for fine-grained referring expression comprehension 200, the machine learning training and inference system 100 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and the computer-implemented method for fine-grained referring expression comprehension 200, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of the machine learning training and inference system 100, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

The processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In the machine learning training and inference system 100, at least some of the instructions for performing the inventive methods may be stored in the block of the computer-implemented method for fine-grained referring expression comprehension 200 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in the block of the computer-implemented method for fine-grained referring expression comprehension 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for fine-grained referring expression comprehension, the computer-implemented method comprising:

receiving, at a processor, a textual expression and an image as inputs; and executing, at the processor, fine-grained referring expression comprehension, the executing comprising:

decomposing the textual expression into different textual modules;

extracting visual regional proposals from the image;

using language-guided graph neural networks (GNNs) to mine fine-grained object relations from the visual regional proposals; and aggregating different matching similarities between the different textual modules and the fine-grained object relations, wherein the decomposing of the textual expression comprises modularized language parsing of the textual expression into main, spatial and relation modules, the modularized language parsing comprising:

using one or more language parser tools to parse a language of the textual expression into subphrases and average word embeddings of each subphrase to obtain a text representation for each of the main module, the spatial module and the relation module, and representing each word in the textual expression with word embeddings and adopting a sequence model to encode the textual expression and to aggregate feature vectors and a representative for each of the main module, the spatial module and the relation module, and wherein the extracting of the visual regional proposals from the image comprises region proposal networking to detect objects in the image, the visual regional proposals being extracted for the image and used to obtain a set of object proposal candidates for the image and building graphs to represent each object in the image with each object in the image regarded as a node in the graphs and relationships between two objects are regarded as edges between two nodes and with the text representations guiding message passing and information flows of nodes in the graphs.

2. The computer-implemented method according to claim 1, wherein the decomposing of the textual expression comprises modularized language parsing.

3. The computer-implemented method according to claim 1, wherein:

the using of the language-guided GNNs to mine the fine-grained object relations from the visual regional proposals comprises building a graph for each textual module, and each graph can learn representations for each textual module and predict matching similarity scores between each visual regional proposal and the textual modules.

4. The computer-implemented method according to claim 1, wherein the aggregating of the different matching similarities is executed iteratively to obtain a final feature embedding for each object in the image.

5. A computer program product for fine-grained referring expression comprehension, the computer program product comprising one or more computer readable storage media having computer readable program code collectively stored on the one or more computer readable storage media, the computer readable program code being executed by a processor of a computer system to cause the computer system to perform a method comprising:

receiving a textual expression and an image as inputs; and executing fine-grained referring expression comprehension, the executing comprising:

decomposing the textual expression into different textual modules;

extracting visual regional proposals from the image;

using language-guided graph neural networks (GNNs) to mine fine-grained object relations from the visual regional proposals; and aggregating different matching similarities between the different textual modules and the fine-grained object relations, wherein the decomposing of the textual expression comprises modularized language parsing of the textual expression into main, spatial and relation modules, the modularized language parsing comprising:

using one or more language parser tools to parse a language of the textual expression into subphrases and average word embeddings of each subphrase to obtain a text representation for each of the main module, the spatial module and the relation module, and representing each word in the textual expression with word embeddings and adopting a sequence model to encode the textual expression and to aggregate feature vectors and a representative for each of the main module, the spatial module and the relation module, and wherein the extracting of the visual regional proposals from the image comprises region proposal networking to detect objects in the image, the visual regional proposals being extracted for the image and used to obtain a set of object proposal candidates for the image and building graphs to represent each object in the image with each object in the image regarded as a node in the graphs and relationships between two objects are regarded as edges between two nodes and with the text representations guiding message passing and information flows of nodes in the graphs.

6. The computer program product according to claim 5, wherein the decomposing of the textual expression comprises modularized language parsing.

7. The computer program product according to claim 5, wherein:

the using of the language-guided GNNs to mine the fine-grained object relations from the visual regional proposals comprises building a graph for each textual module, and each graph can learn representations for each textual module and predict matching similarity scores between each visual regional proposal and the textual modules.

8. The computer program product according to claim 5, wherein the aggregating of the different matching similarities is executed iteratively to obtain a final feature embedding for each object in the image.

9. A computing system, comprising:

a processor;

a memory coupled to the processor; and one or more computer readable storage media coupled to the processor, the one or more computer readable storage media collectively containing instructions that are executed by the processor via the memory to implement a method comprising:

receiving a textual expression and an image as inputs; and executing fine-grained referring expression comprehension, the executing comprising:

decomposing the textual expression into different textual modules;

extracting visual regional proposals from the image;

using language-guided graph neural networks (GNNs) to mine fine-grained object relations from the visual regional proposals; and aggregating different matching similarities between the different textual modules and the fine-grained object relations, wherein the decomposing of the textual expression comprises modularized language parsing of the textual expression into main, spatial and relation modules, the modularized language parsing comprising:

using one or more language parser tools to parse a language of the textual expression into subphrases and average word embeddings of each subphrase to obtain a text representation for each of the main module, the spatial module and the relation module, and representing each word in the textual expression with word embeddings and adopting a sequence model to encode the textual expression and to aggregate feature vectors and a representative for each of the main module, the spatial module and the relation module, and wherein the extracting of the visual regional proposals from the image comprises region proposal networking to detect objects in the image, the visual regional proposals being extracted for the image and used to obtain a set of object proposal candidates for the image and building graphs to represent each object in the image with each object in the image regarded as a node in the graphs and relationships between two objects are regarded as edges between two nodes and with the text representations guiding message passing and information flows of nodes in the graphs.

10. The computing system according to claim 9, wherein the decomposing of the textual expression comprises modularized language parsing.

11. The computing system according to claim 9, wherein:

the using of the language-guided GNNs to mine the fine-grained object relations from the visual regional proposals comprises building a graph for each textual module, and each graph can learn representations for each textual module and predict matching similarity scores between each visual regional proposal and the textual modules.

12. The computing system according to claim 9, wherein the aggregating of the different matching similarities is executed iteratively to obtain a final feature embedding for each object in the image.

* * * * *